(12) United States Patent
Sodagar et al.

(10) Patent No.: US 6,269,192 B1
(45) Date of Patent: Jul. 31, 2001

(54) APPARATUS AND METHOD FOR MULTISCALE ZEROTREE ENTROPY ENCODING

(75) Inventors: Iraj Sodagar, North Brunswick; Bing-Bing Chai, Plainsboro; Paul Hatrack, Highstown; Hung-Ju Lee, Robbinsville, all of NJ (US)

(73) Assignees: Sarnoff Corporation, Princeton, NJ (US); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/107,544

(22) Filed: Jun. 30, 1998

Related U.S. Application Data

(60) Provisional application No. 60/052,245, filed on Jul. 11, 1997, and provisional application No. 60/062,835, filed on Oct. 17, 1997.

(51) Int. Cl.[7] ................ G06K 9/36; G06K 9/46
(52) U.S. Cl. .............. 382/240; 341/79; 375/240.19; 382/247
(58) Field of Search ................ 382/232, 238, 382/240, 244, 247–248; 341/51, 107, 79; 358/261.2, 430; 375/240.11, 240.18, 240.19; 348/397.1, 398.1, 408.1, 416.1, 394.1, 409.1, 411.1, 437.1, 438.1

(56) References Cited

U.S. PATENT DOCUMENTS

| 5,315,670 | | 5/1994 | Shapiro | 382/56 |
| 5,636,033 | * | 6/1997 | Maeda | 382/240 |
| 5,896,176 | * | 4/1999 | Das et al. | 348/416.1 |
| 5,982,938 | * | 11/1999 | Dube | 382/240 |
| 6,026,198 | * | 2/2000 | Okada | 382/247 |

OTHER PUBLICATIONS

Ang et al., Robst Image Compression using the Depth–First Search on the Wavelet Zerotree, Aug. 1999,p. 797–800, IEEE.*
International Search Report for corresponding application PCT/US98/14160.
Jerome M. Shapiro, An Embedded Hierarchical Image Coder Using Zerotrees of Wavelet Coefficients, The David Sarnoff Research Center, 1993, pp. 214–223.

* cited by examiner

*Primary Examiner*—Timothy M. Johnson
(74) *Attorney, Agent, or Firm*—William J. Burke

(57) ABSTRACT

An apparatus and a concomitant method is disclosed for encoding wavelet trees to generate bitstreams with flexible degrees of spatial, quality and complexity scalabilities. The zerotree entropy (ZTE) encoding method is extended to achieve a fully scalable coding method by implementing a multiscale zerotree coding scheme.

24 Claims, 11 Drawing Sheets

APPARATUS AND METHOD FOR MULTISCALE ZEROTREE ENTROPY ENCODING

This application claims the benefit of U.S. Provisional Applications No. 60/052,245 filed Jul. 11, 1997 and No. 60/062,835 filed Oct. 17, 1997, which are herein incorporated by reference.

The invention relates to image and video processing systems and, more particularly, to image and video processing systems for coding wavelet trees, which generates bitstreams with flexible degrees of spatial, quality and complexity scalabilities.

BACKGROUND OF THE DISCLOSURE

Data compression systems are useful for representing information as accurately as possible with a minimum number of bits and thus minimizing the amount of data which must be stored or transmitted in an information storage or transmission system. Wavelet transforms, otherwise known as hierarchical subband decomposition, have recently been used for low bit rate image compression because such decomposition leads to a hierarchical multiscale representation of the source image. Wavelet transforms are applied to an important aspect of low bit rate image coding: the coding of a binary map (a wavelet tree) indicating the locations of the non-zero values, otherwise known as the "significance map" of the transform coefficients. Using scalar quantization followed by entropy coding, in order to achieve very low bit rates, e.g., less than 1 bit/pel, the probability of the most likely symbol after quantization—the zero symbol—must be extremely high. Typically, a large fraction of the bit budget must be spent on encoding the significance map. It follows that a significant improvement in encoding the significance map translates into a significant improvement in the compression of information preparatory to storage or transmission.

To accomplish this task, a new structure called a "zerotree" has been developed. A wavelet coefficient is said to be insignificant with respect to a given threshold T, if the coefficient has a magnitude less than equal to T. The zerotree is based on the hypothesis that if a wavelet coefficient at a coarse scale is insignificant with respect to a given threshold T, then all wavelet coefficients of the same orientation in the same spatial location at finer scales are likely to be insignificant with respect to T.

More specifically, in a hierarchical subband system, with the exception of the highest frequency subbands, every coefficient at a given scale can be related to a set of coefficients at the next finer scale of similar orientation according to a structure called a wavelet tree. The coefficients at the coarsest scale will be called the parent nodes, and all coefficients corresponding to the same spatial or temporal location at the next finer scale of similar orientation will be called child nodes. For a given parent node, the set of all coefficients at all finer scales of similar orientation corresponding to the same location are called descendants. Similarly, for a given child node, the set of coefficients at all coarser scales of similar orientation corresponding to the same location are called ancestors.

Nodes are scanned in the order of the scales of the decomposition, from coarsest level to finest. This means that no child node is scanned until after its parent and all other parents in all subbands at the same scale as that parent have been scanned. This is a type of modified breadth-first, subband by subband, traversal performed across all the wavelet trees defined by the coefficients of the wavelet transform of the two-dimensional data set.

Given a threshold level to determine whether or not a coefficient is significant, a node is said to be a ZEROTREE ROOT if 1) the coefficient at a node has an insignificant magnitude, 2) the node is not the descendant of a root, i.e., it is not completely predictable from a coarser scale, and 3) all of its descendants are insignificant. A ZEROTREE ROOT is encoded with a special symbol indicating that the insignificance of the coefficients at finer scales is completely predictable. To efficiently encode the binary significance map, four symbols are entropy coded: ZEROTREE ROOT, ISOLATED ZERO, and two non-zero symbols, POSITIVE SIGNIFICANT and NEGATIVE SIGNIFICANT.

U.S. Pat. No. 5,412,741 issued May 2, 1995 and herein incorporated by reference discloses an apparatus and method for encoding information with a high degree of compression. The apparatus uses zerotree coding of wavelet coefficients in a much more efficient manner than any previous techniques. The key to this apparatus is the dynamic generation of the list of coefficient indices to be scanned, whereby the dynamically generated list only contains coefficient indices for which a symbol must be encoded. This is a dramatic improvement over the prior art in which a static list of coefficient indices is used and each coefficient must be individually checked to see whether a) a symbol must be encoded, or b) it is completely predictable. The methods as discussed in the '741 patent are known as the "Embedded Zerotree Wavelet" (EZW) method.

Alternatively, the coding of wavelet trees (e.g., zerotree) can be performed depth-first across all the wavelet trees defined by the coefficients of the wavelet transform of the two-dimensional data set. This method of wavelet coding is known as Zerotree Entropy (ZTE) encoding, which is described in an U.S. patent application filed on Dec. 31, 1997 with the title "Apparatus And Method For Encoding Wavelet Trees Generated By A Wavelet-Based Coding Method" (attorney docket SAR 12234; Ser. No. 09/002,251), hereby incorporated by reference.

Although it has been found that ZTE is an effective wavelet coding method, various applications can benefit from a flexible wavelet coding method that can provide multi-scale wavelet coding, i.e., providing scalability in spatial resolution and quality.

Therefore, there is a need in the art for coding wavelet trees, which generates bitstreams with flexible degrees of spatial, quality and complexity scalabilities.

SUMMARY OF THE INVENTION

The present invention is an apparatus and a concomitant method of encoding wavelet trees to generate bitstreams with flexible degrees of spatial, quality and complexity scalabilities. The ZTE method is extended to achieve a fully scalable coding method by implementing a multiscale zerotree coding scheme.

More specifically, the wavelet coefficients of the first spatial resolution (and/or quality (signal-to-noise (SNR))) layer are first quantized with a first quantizer Q0. These quantized coefficients are scanned using the zerotree concept and then the significant maps and quantized coefficients are entropy coded. The output of the entropy coder at this level, BS0, comprises the first portion of the bitstream.

Next, the quantized wavelet coefficients of the first layer are also reconstructed and subtracted from the original wavelet coefficients. These "residual" wavelet coefficients are fed into the next stage of the coder in which the wavelet coefficients are quantized with a second (next) quantizer, Q1, which is then followed by zerotree scanned and entropy coded. The output of this stage, BS1, comprises the second portion of the output bitstream.

The quantized coefficients of the second stage are again reconstructed and subtracted from the original coefficients. This process is continued for N stages to provide N layers of scalability. Each stage represents one layer of SNR or spatial (or both) scalability. Spatial scalability is provided by applying the above N-stage coder to different spatial resolutions of the input image. Thus, a wide range of scalability levels or layers are efficiently generated and inserted into the resulting bitstreams, where they are extracted, e.g., by a decoder as needed for a particular application.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
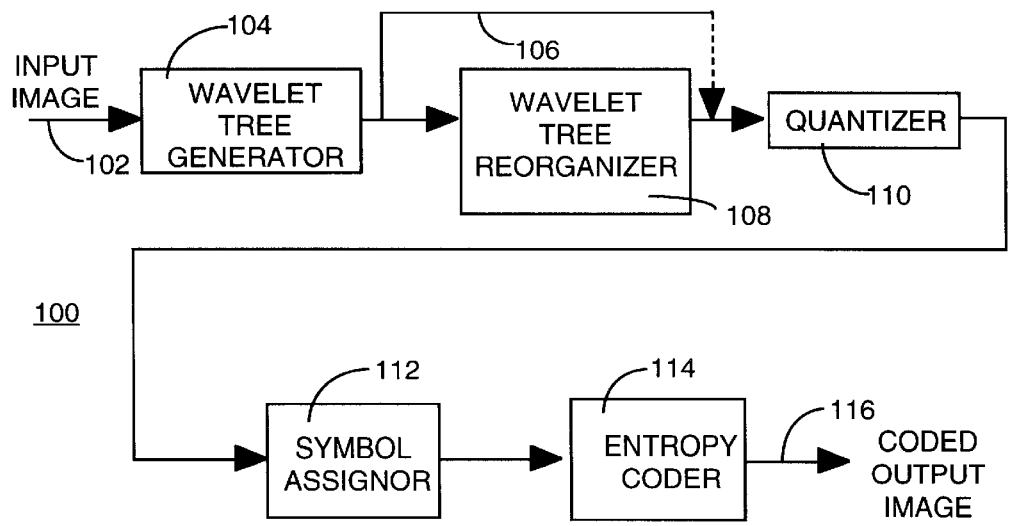
FIG. 1 is a block diagram of an image encoder of the present invention.
Figure 2:
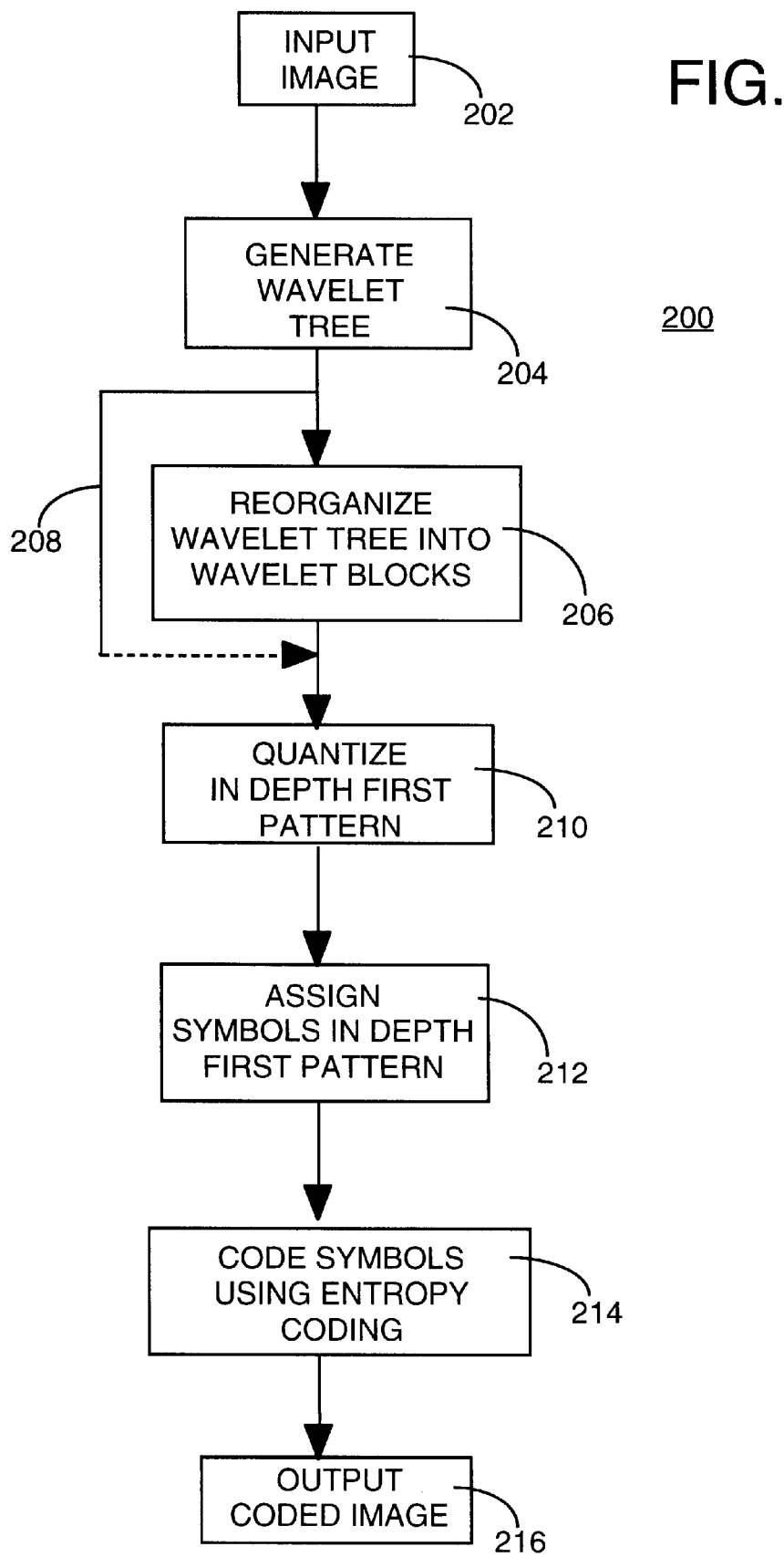
FIG. 2 is a flowchart illustrating the encoding method of the encoder shown in FIG. 1.

FIG. 1 depicts a block diagram of an encoder 100 of the present invention and FIG. 2 depicts a flowchart representation of the operation of the encoder 100 of FIG. 1. To best understand the invention, the reader should simultaneously consult both FIGS. 1 and 2 while reading the following description of the invention. Furthermore, the present invention is first described with respect to ZTE and then the necessary modifications to produce a multi-scale ZTE.

The encoder 100 contains a wavelet tree generator 104, an optional wavelet tree reorganizer 108, a quantizer 110, a symbol assignor 112, and an entropy encoder 114. Each of these components is connected in series to process an image at port 102 into a coded output image at port 116. The input image is typically a pixelated (digitized) photographic image as can be produced from an image scanner or a computer graphics system. However, the input image can also be a frame within a series of frames of video images or a motion compensated residual frame produced by a video encoding system. In general, the invention processes any form of digitized image or portion thereof. Thus, the method of operation generally begins at step 202 with the input of an "image", i.e., any form of two-dimensional data.

The wavelet tree generator 104 performs (at step 204) a wavelet hierarchical subband decomposition to produce a conventional wavelet tree representation of the input image. To accomplish such image decomposition, the image is decomposed using times two subsampling in each of two-dimensions into high horizontal-high vertical (HH), high horizontal-low vertical (HL), low horizontal-high vertical (LH), and low horizontal-low vertical (LL), frequency subbands. The LL subband is then further subsampled times two in each of two dimensions to produce a set of HH, HL, LH and LL subbands. This subsampling is accomplished recursively to produce an array of subbands such as that illustrated in FIG. 3 where three subsamplings have been used. Preferably four or more subsamplings are used in practice, but the present invention can be adapted to any number of subsamplings. The parent-child dependencies between subbands are illustrated as arrows pointing from the subband of the parent nodes to the subbands of the child nodes. The lowest frequency subband is the top left $LL_3$, and the highest frequency subband is at the bottom right $HH_1$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 3445–62, December 1993.

Figure 4:
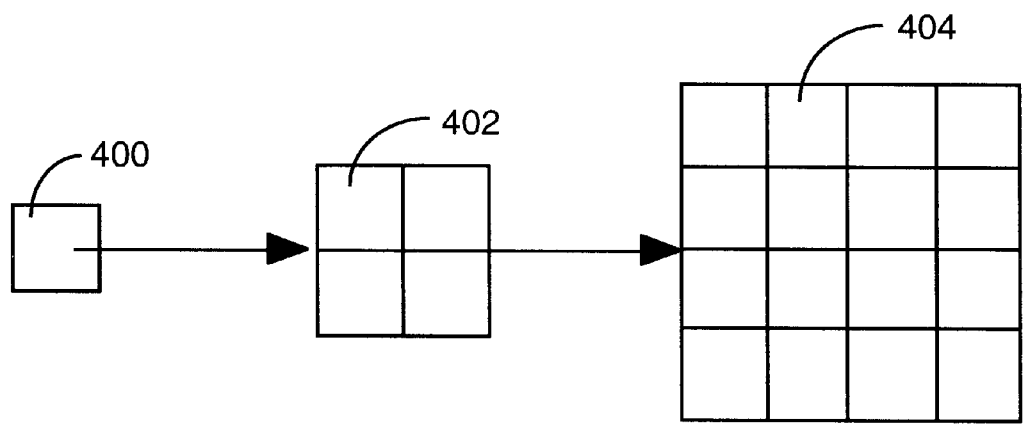
FIG. 4 depicts the parent-child relationship for three generations of a subsampled image.

FIG. 4 depicts the parent-child relationship for three generations of a subsampled image. A single parent node 400 has four child nodes 402 corresponding to the same region in the image with times four subsampling, i.e., times two subsampling in each of two dimensions. Each child node 402 has four corresponding next generation child nodes 404 with a further times four subsampling. The relationship, or data structure, that relates a parent node to its children and grandchildren is a wavelet tree. Note that each pel or pixel in the low-low subband has a "tree" associated with it. However, the plurality of trees that extend from the low-low subband taken together are generally discussed in the art as the "wavelet tree" for the image. This disclosure will also follow this nomenclature.

Returning to FIGS. 1 and 2, the quantizer 110 quantizes (at step 210) the coefficients of the wavelet tree via path 106 in a "depth-first" pattern. Namely, the method traverses each tree from the root in the low-low subband ($LL_3$) through the children.

Figure 5:
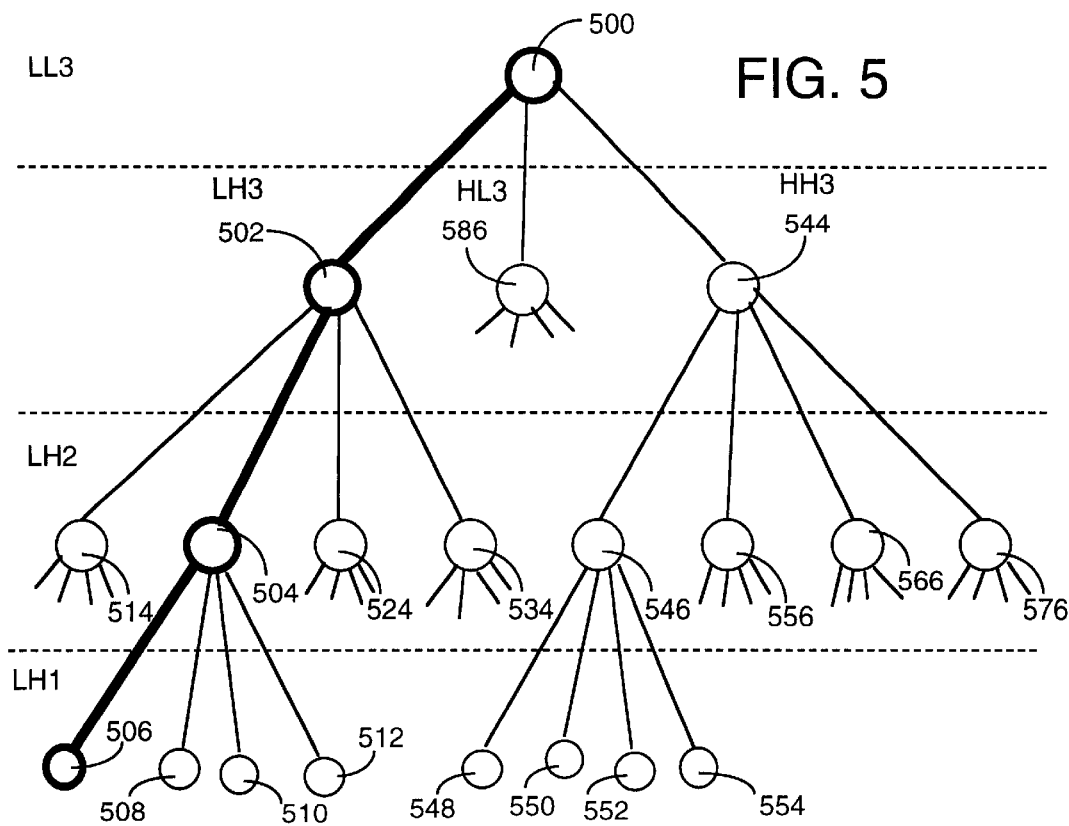
FIG. 5 depicts a schematic representation of the interrelation of various nodes within a wavelet tree.

FIG. 5 depicts the depth-first pattern used to traverse each tree. For example, beginning at node 500 in $LL_3$ and following the bold path, the inventive depth-first process proceeds to node 502 in subband LH$_3$ and then to node 504 in subband LH$_2$. From node 504, the depth-first traversal process successively continues to nodes 506, 508, 510 and 512 within subband LH$_1$, i.e., all the children of node 504, then continues on to the siblings of 504 (514, 524, 534) where the four children of each sibling are traversed before the next sibling and its children. Once this entire branch of the tree is traversed, the traversal process proceeds to another child node of node 500, for example, node 544. From that node, the depth-first traversal process proceeds to nodes 546, 548, 550, 552 and 554 before going on to node 556 and so on.

As each branch is traversed, the coefficients are quantized into discrete values. Any quantization approach can be used with the present invention. The quantization process maps a continuous coefficient value to a discrete value having either a positive value, a negative value or zero value. In sum, in a depth-first scan pattern, children 506, 508, 510, and 512 are scanned after their parent 504 and before any of the neighboring parents 514, 524 and 534. In this manner, all coefficients that represent a given spatial location are scanned, in ascending frequency order from parent 500 to child 502 to grandchild 504 and so on, before the coefficients of the next adjacent spatial location is scanned.

Although the foregoing description of the depth-first scanning pattern was discussed as a "top down" pattern, a depth-first scanning pattern also includes scanning from the bottom up. As such, the quantization can also be accomplished by starting at a tree's "leaves" (the bottom-most nodes) and proceeding up the tree. Using the example of FIG. 5, in a "bottom up" pattern, nodes 506, 508, 5and 512 would be quantized first, then node 504, and so on up the tree to 500 last. Once that tree was complete, the quantization process would quantize another tree, and another, and so on until all the nodes in all the trees were quantized. As shall be discussed below, the invention operates more efficiently when using a bottoms up pattern than the top down.

To facilitate this depth-first scanning pattern, the invention reorganizes the quantized coefficients of each wavelet tree to form a "wavelet block". As shown in FIGS. 1 and 2, the reorganization is accomplished (at step 206) in the wavelet tree reorganizer 108 prior to quantization.

Figure 6:
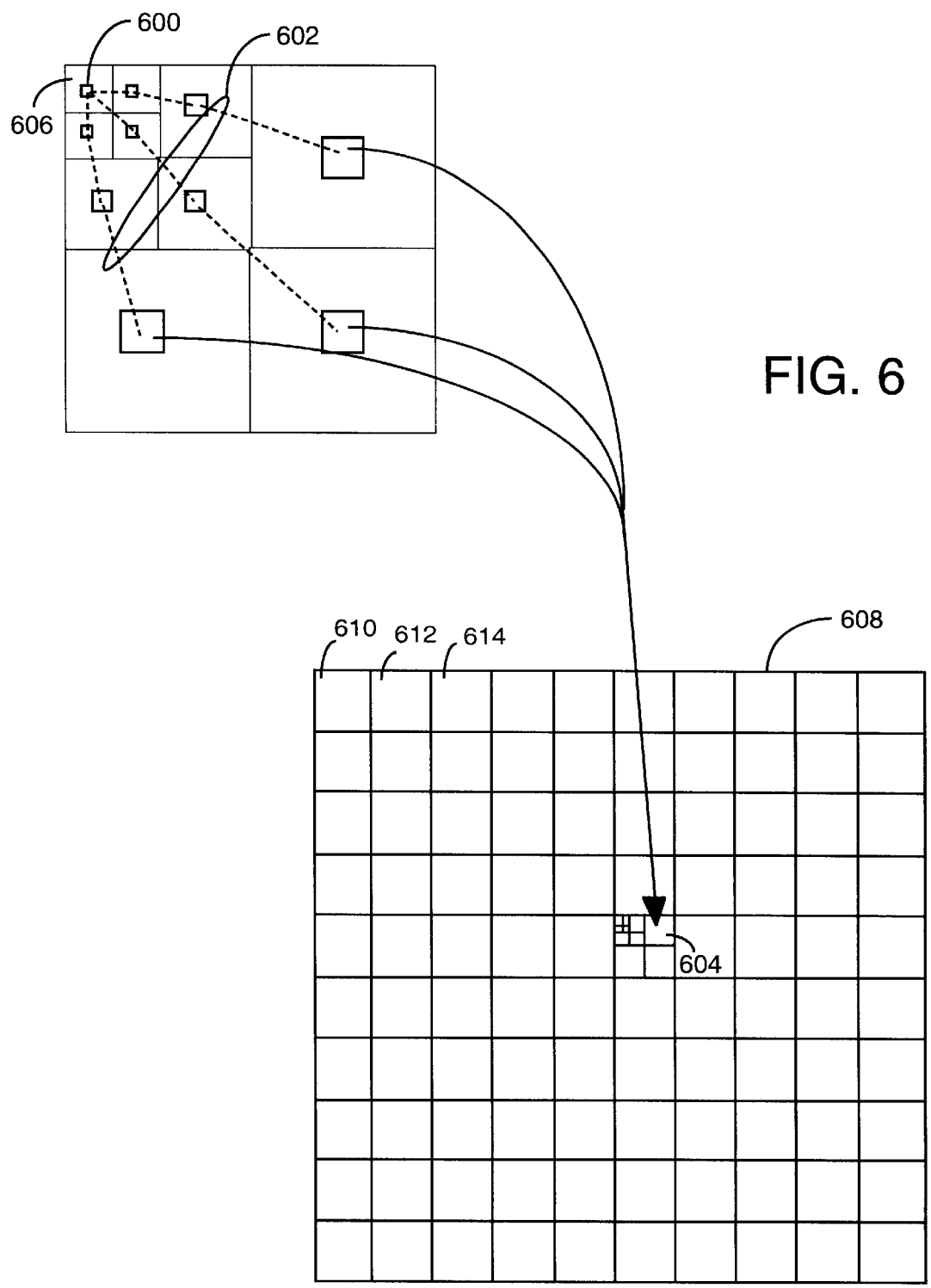
FIG. 6 depicts a wavelet block representation of a wavelet tree.

FIG. 6 schematically depicts a wavelet block 604 that is generated by the invention. The invention maps a tree 602 extending from a pixel 600 in the low-low band 606 (LL$_3$) in the wavelet tree 602 into a wavelet block 604. Each wavelet block 604 of an image frame 608 comprises those coefficients at all scales and orientations that represent the frame at the spatial location of the block within the frame. The reorganization is accomplished by physically remapping the memory locations of the coefficients to new memory locations that form the wavelet blocks. As such, all the coefficients of a given wavelet block are stored at sequential address locations. Alternatively, the coefficients are not physically rearranged, but are rather remapped into a virtual memory. Thus, an index into the physical memory is created, where the index (virtual memory) has memory locations that are arranged into wavelet blocks. For each access into the index, the address into the index is mapped to a physical memory location where the coefficient is stored. Thus, by a virtual memory approach, the advantages of wavelet blocks are available without physically rearranging the coefficients in memory.

By using a depth-first scanning pattern, each wavelet block is completely scanned to quantize its coefficients before the next block is scanned and so on. For example, block 6is completely scanned, then block 612, then block 614, and so on in a raster scan pattern through the frame of wavelet blocks. The ordering of blocks does not have to be in a raster scan pattern, but can be any order as desired by the application. This includes object-oriented whereby blocks corresponding to certain objects are scanned and coded before other objects. Since an entire block is located at consecutive memory addresses, the block can easily be scanned in a top down or bottoms up pattern by selecting either the first or last memory entry for a given block and accessing all other addresses in ascending or descending order.

Importantly, with such reorganization, each wavelet block can be assigned a different quantizer scale based on its spatial location in the frame. This permits the quantizer 110 to be allocated specifically for a spatial location of the coefficients and/or in accordance with the frequency band represented by the coefficient. As such, the scale of the quantizer can be different across an image such that the center of the image or certain objects within the image can be more accurately quantized than the edges. Similarly, the quantizer scale could be frequency dependent such that higher frequency (or, for that matter, lower frequencies, middle frequencies, various frequency bands, and the like) can be quantized using a scale that is different from other frequencies. Also, instead of a single quantizer, a quantization matrix can be used to code each wavelet block.

Although wavelet blocks form an intuitive data structure for implementing the invention, use of wavelet blocks is optional and is not necessary to the implementation of the inventive encoder 100 and other encoders described below. As shall be discussed below, the conventional tree structure can be used in conjunction with the improved tree traversal process and the improved coding technique of the present invention. As such, FIGS. 1 and 2 depict the optional nature of the reorganizer as path 106 and path 208 which respectively bypass the reorganizer and its associated function.

After quantization, at each node of the tree, the quantized coefficient has either a zero value or a non-zero value. "Zerotrees" exist wherever the coefficient at a node is zero and all its descendants form zerotrees, i.e., all descendant nodes have a zero value. The quantized coefficients of the wavelet tree are efficiently encoded by again scanning each tree in a depth-first manner. Thus, symbol assignor 112 operates (at step 212) by traversing the tree and assigning particular symbols to each node depending upon the node's quantized value as well as the quantized values of each node's descendants.

Specifically, at each node, the inventive method assigns one of three symbols: ZEROTREE ROOT, VALUED ZEROTREE ROOT, and VALUE. A ZEROTREE ROOT denotes a coefficient that is the root of a zerotree. After the scan in which symbols are assigned, the zerotree does not need to be scanned any further because it is known that all coefficients in the tree have the value zero. A VALUED ZEROTREE ROOT is a node where the coefficient has a non-zero value and all four children are ZEROTREE ROOTS. The coding scan of this tree never progresses below this node. A VALUE symbol identifies a coefficient with a value, either zero or non-zero, but also with some descendant somewhere further along the tree that has a non-zero value. As an option, a fourth symbol, Isolated Zero(IZ), can be added to the significant map. In this case, IZ symbol identifies a coefficient with zero value, but with some descendant somewhere further along with a nonzero. If IZ is added, then VAL only represents the nonzero coefficient which has one or more nonzero descendants.

Figure 7:
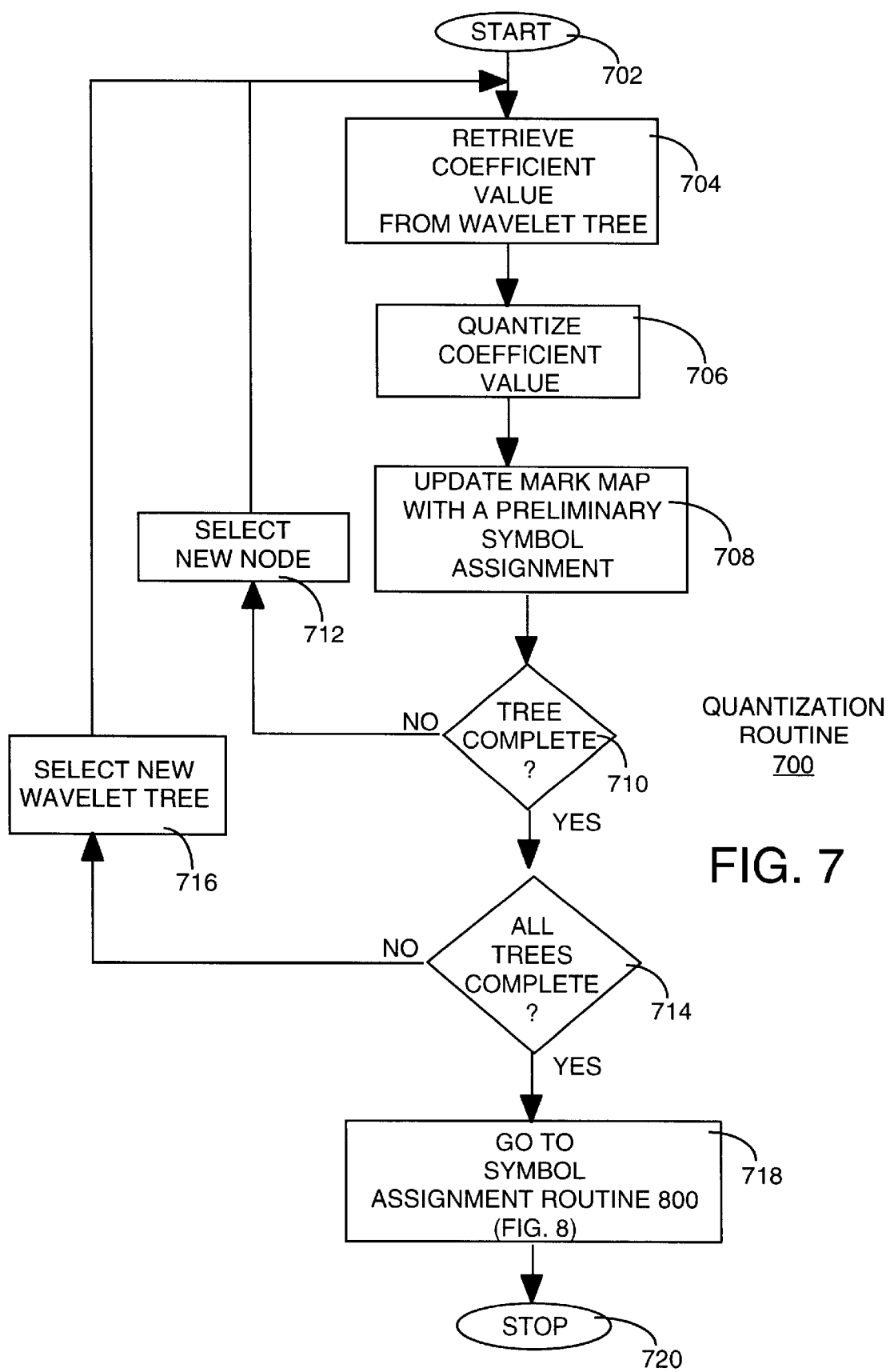
FIG. 7 depicts a flowchart of a quantization method executed by the present invention.
Figure 8:
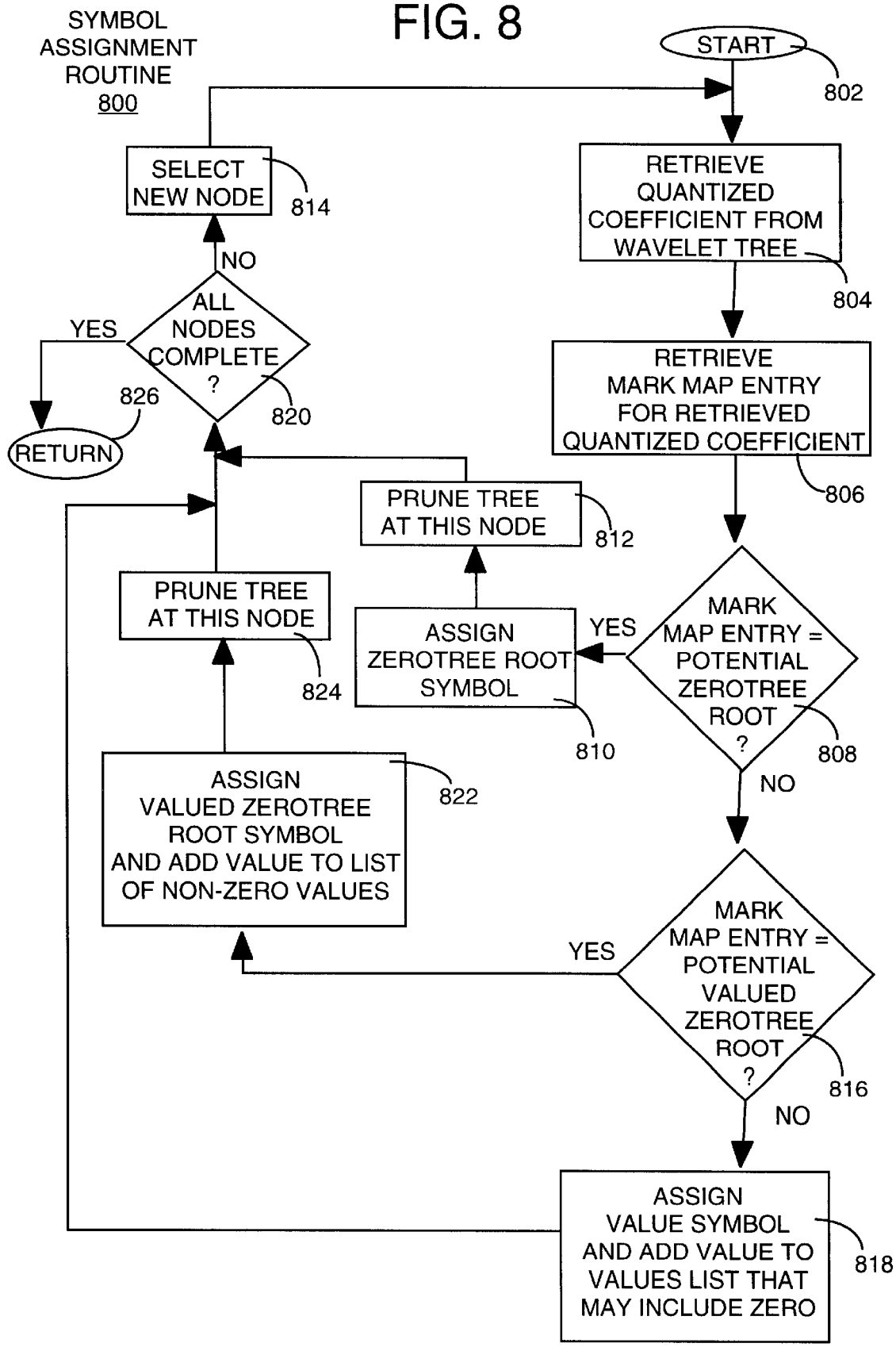
FIG. 8 depicts a flowchart of a symbol assignment method executed by the present invention.

To most efficiently scan the trees to quantize and assign symbols to the nodes, the quantizer operates in conjunction with the symbol assignor. FIG. 7 depicts a detailed flowchart of a quantization method 700 used to quantize the coefficients of a zerotree and FIG. 8 depicts a detailed flowchart of a symbol assignment method 800 for assigning symbol values to represent the quantized coefficient values.

The method 700 begins at block 702 and proceeds to step 704 where a coefficient value is retrieved from a node in a wavelet tree. As shall be discussed below, the quantization method scans the wavelet tree in a bottom up, depth-first pattern. Thus, the first address is always in the highest frequency subband and, with each iteration through the method, the method proceeds up the tree to lower and lower frequency subbands. As the quantized values are generated, the method keeps track of the quantized values of the child nodes, i.e., are the children valued or zero. At step 706, the method quantizes the retrieved coefficient value into a positive value, a negative value, or zero value. At step 708, a mark map is updated with a preliminary symbol value for the node associated with the coefficient value just quantized. The mark map symbol depends upon the value of the child nodes as well as the value of the present node. Note that, because the scan is accomplished bottom up, the mark map is not capable of conclusively indicating whether a node is a ZEROTREE ROOT or not. Consequently, after all the nodes are assigned a preliminary symbol value, the tree is scanned again in a top down pattern to conclusively assign symbol values. The mark map is an index of the wavelet tree nodes which is filled by the quantization method 700. At each address in the mark map, the method stores a preliminary symbol: potential VALUE, potential VALUED ZEROTREE ROOT, or potential ZEROTREE ROOT (and optionally, ISOLATED ZERO). If the quantized coefficient value has a value, the mark map location for that coefficient is marked with a potential VALUE symbol. If the quantized coefficient value is zero value and all of that nodes children are zero valued, then the mark map location is marked with a potential ZEROTREE ROOT. Optionally, if the quantized coefficient has zero value, but some of its descendants are nonzero, then it is marked with the Isolated Zero symbol. Lastly, if the quantized value has a value and its children are all zero valued, then the mark map location is marked with a potential VALUED ZEROTREE ROOT.

At step 710, the method queries whether all the nodes in the wavelet tree have been quantized. If the query is negatively answered, the method proceeds to step 712 where a new (next) node or tree in the wavelet tree is selected for quantization. The method then returns to step 704. If the query at step 710 is affirmatively answered the method proceeds to step 714. The method queries at step 714 whether all the trees have been quantized. If the query is negatively answered, the method selects, at step 716, a new (next) tree or quantization. If the query at step 714 is affirmatively answered, the method proceeds to step 718. At this point in method 700, all the nodes in all the trees have been quantized and assigned a preliminary symbol. At step 718, the method 700 calls symbol assignment method 800 of FIG. 8. After the symbols are assigned, method 700 ends at block 720.

Method 800 scans the trees in a top down pattern, i.e., root to leaves. However, the method does not need to access every node because the trees are pruned at each occurrence of a ZEROTREE ROOT or a VALUED ZEROTREE ROOT. Specifically, method 800 is entered at step 802 and proceeds to step 804. At step 804, the method retrieves a quantized coefficient from the tree of quantized coefficients. At step 806, the method retrieves the preliminary symbol in the mark map that corresponds to the retrieved coefficient. The method queries at step 808 whether the preliminary symbol is a potential ZEROTREE ROOT. If the query is affirmatively answered, the method assigns, at step 810, the ZEROTREE ROOT symbol to the node. Then, at step 812, the method prunes the tree, i.e., the method ignores all nodes below this ZEROTREE ROOT node because, by definition, all the nodes have a zero value.

The method queries at step whether all nodes have been selected. If the query at step 812 is negatively answered, the method proceeds along the NO path to step 814. At step 814, the method selects the next node, after any pruned branches are skipped, in the tree such that a top down, depth-first scan is accomplished.

If the query at step 808 is negatively answered, the method proceeds along the NO path to step 816. At step 816, the method queries whether the mark map contains a potential symbol of potential VALUED ZEROTREE ROOT. If the query at step 816 is affirmatively answered, the method, at step 822, assigns a VALUED ZEROTREE ROOT symbol to the node, puts the value on a list of non-zero values, and prunes the tree at step 824. The method queries at step 820 whether all nodes have been selected. If the query at step 820 is negatively answered, the method proceeds to step 814. Then the method, at step 814, selects the next node for symbol assignment, skipping the pruned branches.

If the query at step 816 is negatively answered, the method assigns, at step 818, a VALUE symbol to the node, and puts a value on the list of values that include the value zero. The method queries at step 820 whether all nodes have been selected. If the query at step 820 is negatively answered, the method proceeds to step 814. Then, the method selects, at step 814, the next node for symbol assignment.

The assignment method continues until all nodes have had symbols assigned to them. Thus, if the query at step 820 is affirmatively answered, the method proceeds to step 826, where the method 800 ends or returns to method 700. The methods as discussed in FIGS. 7 and 8 are collectively known as Zero-Tree Entropy coding (ZTE).

Returning to FIGS. 1 and 2, the symbols and values are encoded (at step 214) using an entropy coder 114, such as a conventional arithmetic coder. One possible way to accomplish encoding is as follows. The symbols are encoded using a three-symbol alphabet. The list of non-zero values that correspond one-to-one to the VALUED ZEROTREE ROOT symbols is encoded using an alphabet that does not include the value zero. The remaining coefficients, which correspond one-to-one to the VALUE symbols, are encoded using an alphabet that does include the value zero. For any node reached in a scan that is a leaf with no children, neither root symbol could apply. Therefore, some bits can be saved by not encoding any symbol for this node and encoding the coefficient using the alphabet that includes the value zero.

An illustrative encoder using a three-symbol or optionally four symbol coding alphabet for the symbols and a multi-symbol alphabet for the values would follow that disclosed in Witten et al., "Arithmetic Coding for Data Compression", Comm. of the ACM, Vol. 30, No. 6, pp. 520–540, June 1987. In fact, those skilled in the art will realize that the present invention can be modified by simply encoding only the values (or representations of those values) of the coefficients in accordance with the assigned symbols. Namely, only the values of the coefficients are encoded without having to encode the symbols that indicated the importance of the coefficients.

The encoder 100 generates (at step 216) the coded output image at port 116. Through utilization of the present invention, an image is rapidly and efficiently coded using one of three symbols at each node of a wavelet tree plus bits to encode coefficient values.

In the present invention, the above ZTE method is adapted to encode wavelet trees to generate bitstreams with flexible degrees of spatial, quality and complexity scalabilities. More specifically, FIGS. 9–11 illustrate three different examples of bitstreams having different scalabilities.

Figure 9:
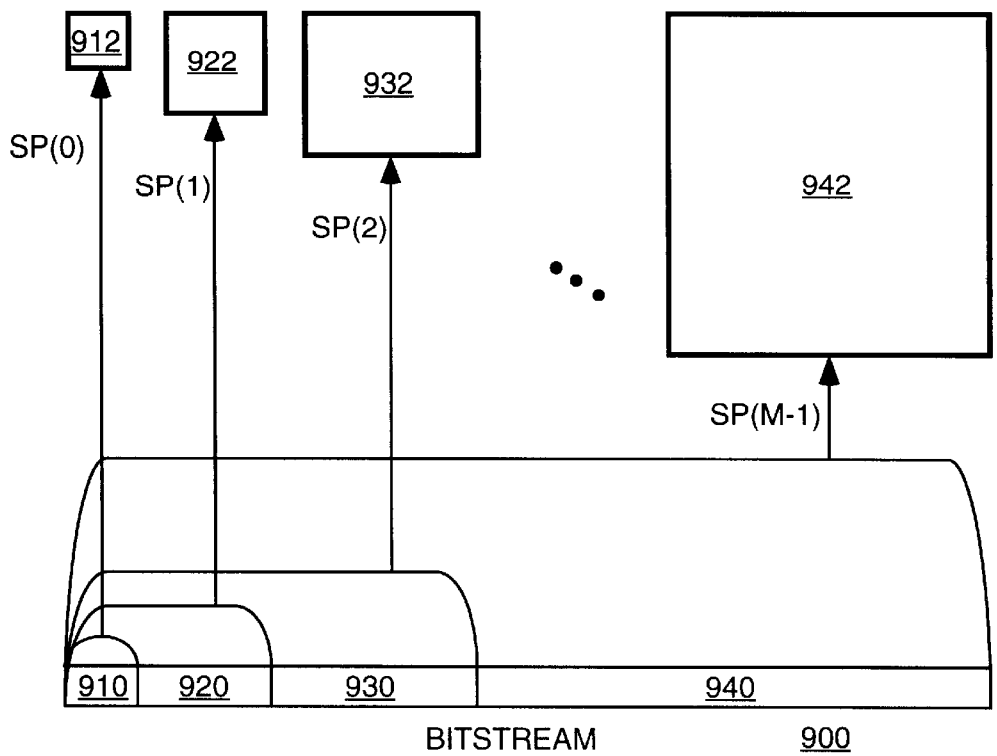
FIG. 9 depicts a block diagram of a bitstream with layers of spatial resolution scalability.

FIG. 9 illustrates a block diagram of a bitstream 900 with M layers of spatial resolution scalability. Namely, the bitstream is constructed such that the information representing spatial resolutions 912–942 of an input image corresponds to different portions 910–940 of the bitstream 900. In this fashion, if a decoder needs to obtain a spatial resolution 912 of the input image, then the decoder simply decodes the corresponding portion 910 of the bitstream. Thus, if a decoder needs to obtain higher spatial resolutions of the input image, the decoder simply decodes the relevant portions of the bitstream as needed.

Figure 10:
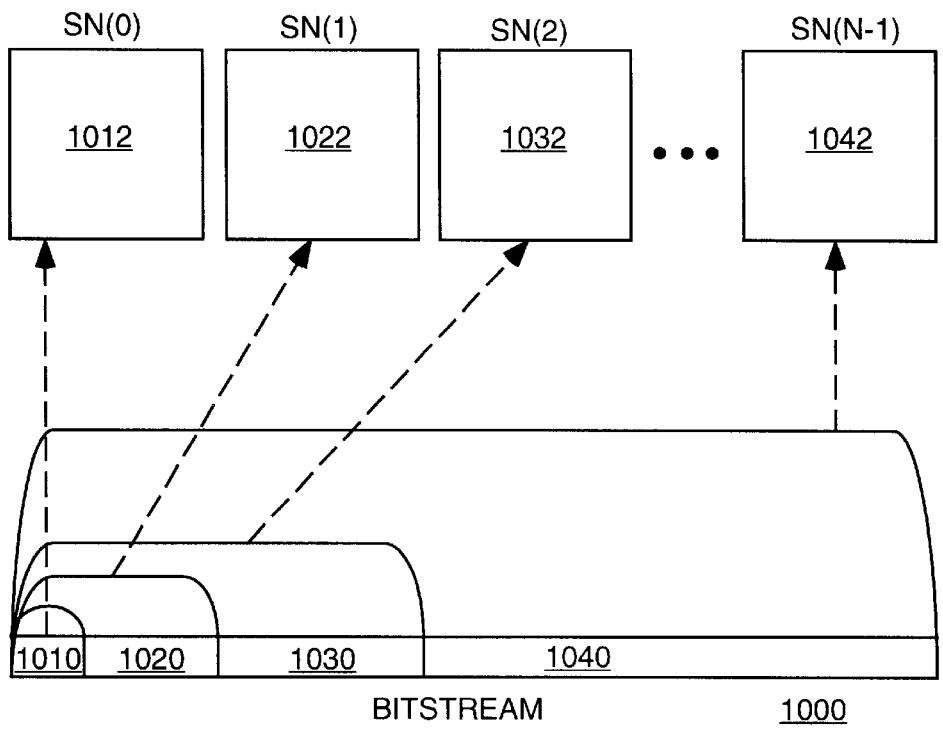
FIG. 10 depicts a block diagram of a bitstream with layers of SNR or quality scalability.

FIG. 10 illustrates a block diagram of a bitstream 1000 with N layers of SNR or quality scalability. Namely, the bitstream is constructed such that the information representing different qualities 1012–1042 of an input image corresponds to different portions 1010–1040 of the bitstream 1000. In this fashion, if a decoder needs to obtain a particular quality 1012 of the input image, then the decoder simply decodes the corresponding portion 1010 of the bitstream. Thus, if a decoder needs to obtain higher qualities of the input image, the decoder simply decodes the relevant portions of the bitstream as needed.

Figure 11:
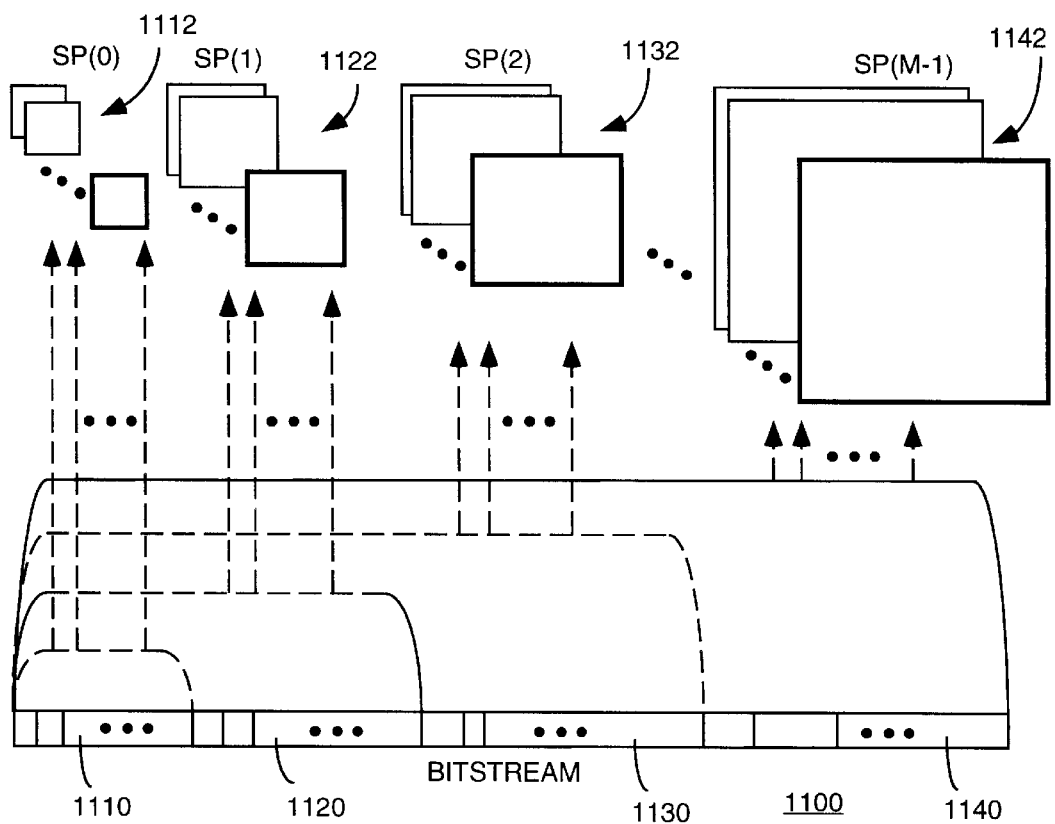
FIG. 11 depicts a block diagram of a bitstream with combined SNR spatial scalabilities.

Finally, in FIG. 11, the bitstream 1100 has M layers of spatial resolution and N layers of SNR scalability, i.e., combined SNR-spatial scalabilities. Namely, the bitstream is constructed such that the information representing different combined SNR-spatial scalabilities 1112–1142 of an input image corresponds to different portions 1110–1140 of the bitstream 1100. In this fashion, if a decoder needs to obtain a particular combination of SNR-spatial scalability 1112 of the input image, then the decoder simply decodes the corresponding portion 1110 of the bitstream. The number and the kind of scalability (SNR, spatial) are described in the bitstream by the encoder.

Figure 12:
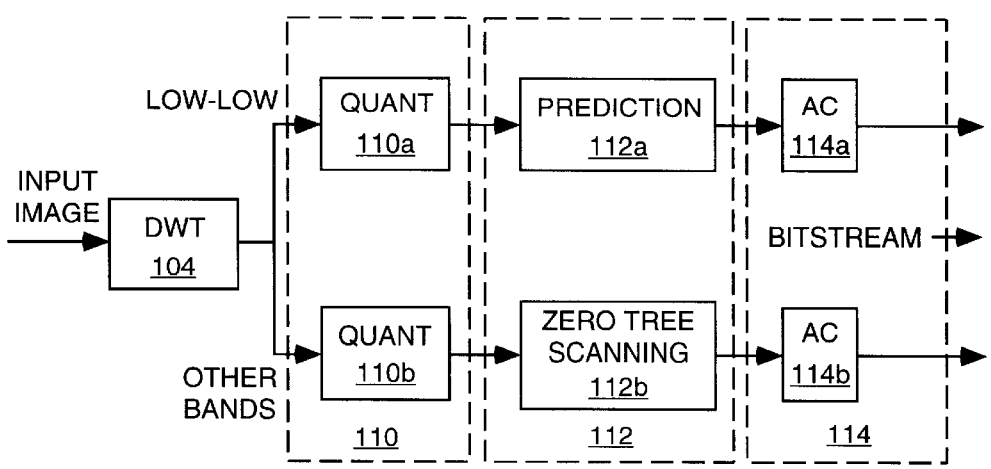
FIG. 12 illustrates a detailed block diagram of the image encoder of FIG. 1.

FIG. 12 illustrates a detailed block diagram of the image encoder 100. More specifically, a two 2-d separable wavelet decomposition is applied to the input image in discrete wavelet transform (DWT or wavelet tree generator) 104. The number of decomposition levels of the luminance component is defined by the encoder and placed into the bitstream. The chrominance components are decomposed to one level less than the luminance components.

Next, the encoder codes the lowest subband differently and independently from that of the other subbands. These coefficients are quantized e.g., using a uniform midriser quantizer 110a. After quantization of the lowest subband coefficients, a prediction module 112a applies a backward prediction coding method to code the quantized values of the LL band as described below.

Figure 13:
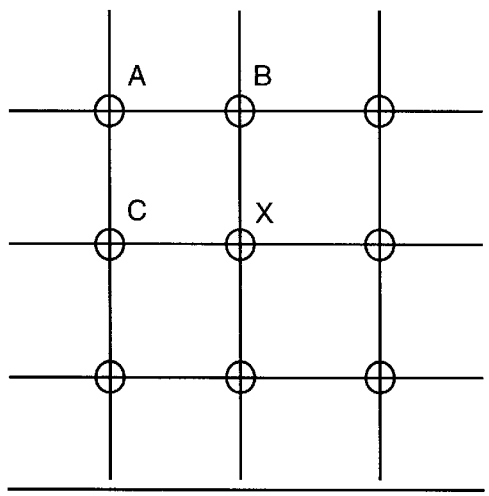
FIG. 13 is a schematic illustration of four non-zero wavelet coefficients.

Referring to FIG. 13, if a, b, c and x are four non-zero wavelet coefficients in the LL band, a difference value is coded in term of x as follows:

$$\text{if } abs(a-b) < abs(a-c), \text{ then code } x-c \text{ else, code } x-b \qquad (1)$$

In turn, the decoder computes the value x as follows:

$$\text{if } abs(a-b) < abs(a-c), \text{ then } x = value + c \text{ else, } x = value + b \qquad (2)$$

where "value" is the value received by the decoder. In sum, equation (1) indicates that if abs(a-b)<abs(a-c), then x is closer to c (a horizontal coefficient), and if not, then x is closer to b (a vertical coefficient). Thus, this method does not require the transmission of bits (overhead) to describe the direction in which the prediction is based.

Next, the coefficients from the backward prediction are then encoded using an adaptive arithmetic coder 114a. First, the minimum value of the coefficients is found. This value, "band_offset", is subtracted from all the coefficients to limit their lower bound to zero. Next, the maximum value of the coefficients is found ("band_max_value"). The values "band_offset" and "band_max_value" are placed into bitstream. Namely, the arithmetic coder is initialized with an uniform distribution of "band_max_value" seeds and then the coefficients are scanned and coded using the adaptive arithmetic coder.

Figure 14:
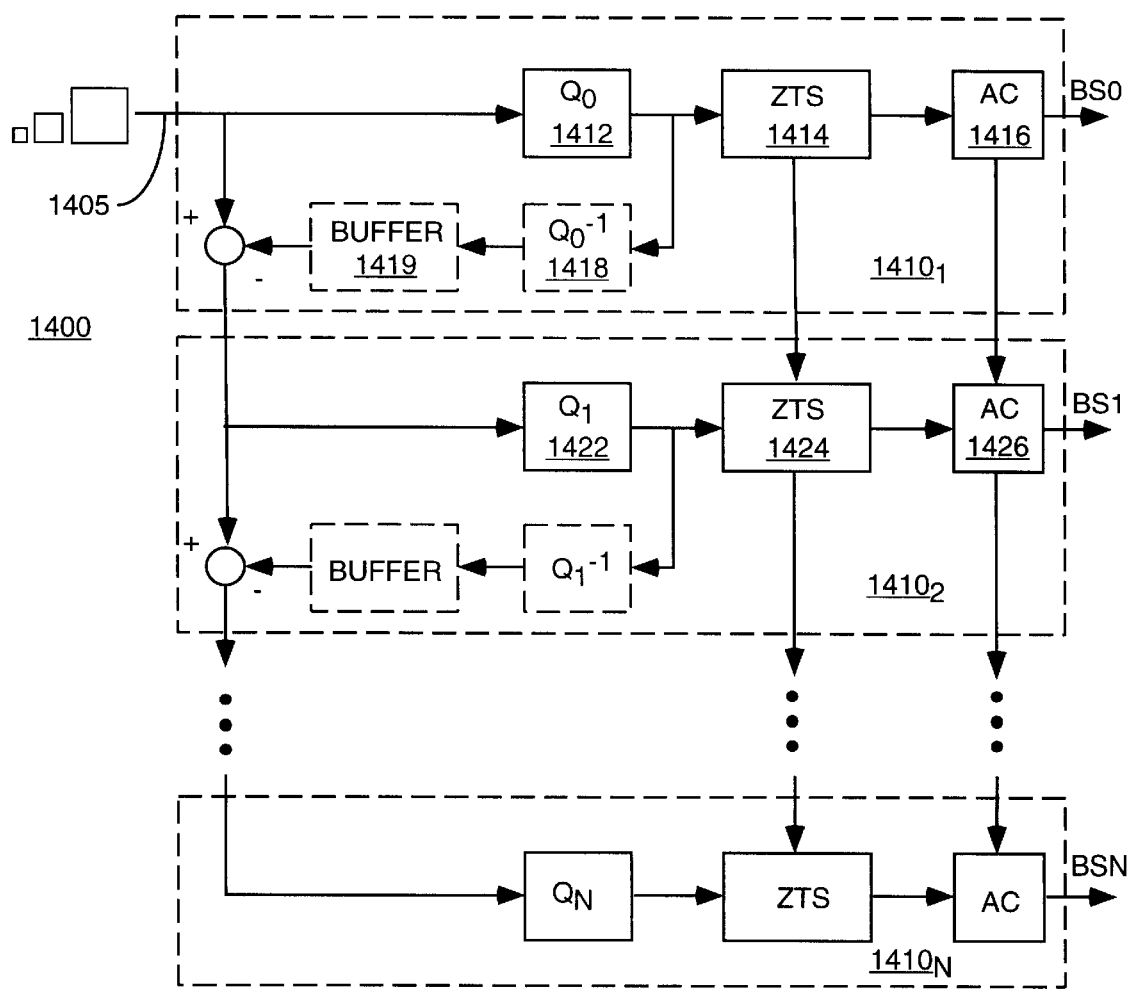
FIG. 14 illustrates a block diagram of a portion of an encoder for generating SNR scalability layers.

Returning to FIG. 12, the encoder codes the higher subbands in a different manner from that of the low-low band. More specifically, in order to achieve a wide range of scalability levels or layers, a multiscale zerotree coding method is employed, where the quantizer 110b, the zerotree scanning (ZTS) 112b and the arithmetic coder 114b are implemented in a plurality of stages as illustrated in FIG. 14.

FIG. 4 illustrates a block diagram of a portion 1400 of an encoder for generating SNR layers. More specifically, encoding portion 1400 of the encoder comprises a plurality of stages $1410_{1-n}$, where each stage assists in generating a SNR layer.

In operation, the wavelet coefficients of the input image of a particular spatial resolution (different spatial resolutions of the input image can be used) are quantized with the quantizer $Q_0$ 1412. These quantized coefficients are scanned by ZTS module 1414 using the above zerotree concept and then the significant maps and quantized coefficients are entropy coded by entropy (or arithmetic) coder 1416 as discussed above in FIGS. 7 and 8. The output of the entropy coder 1416 at this level, BS0, is the first portion of the bitstream, e.g., the first SNR layer.

The present entropy (arithmetic) coder gathers statistics to provide insight or reveal a trend, e.g., as to a range of coefficient values and their locations relative to other coefficient values. Such information can be used by the arithmetic coder to improve coding efficiency, e.g., assigned symbols with less bits to represent frequently encountered types or coefficient values. A plurality of alternate embodiments implementing different entropy (arithmetic) coders are provided below.

Next, the quantized wavelet coefficients of the first layer are also reconstructed and subtracted from the original wavelet coefficients via inverse quantizer 1418 and buffer 1419. The "residual wavelet coefficients" are then fed into the second stage $1410_2$ of the coder in which the wavelet coefficients are quantized with $Q_1$, and then zerotree scanned via ZTS module 1424 and entropy coded via entropy coder 1426. It should be noted that the residual wavelet coefficients may represent the error introduced by the quantization process. As such, subsequent outputs $BS_x$ can be perceived as "refinements" that can be used by the decoder to refine the reconstruction of the quantized wavelet coefficients. However, it should also be noted that changing the quantizer scale in the next stage may also introduce new wavelet coefficients that may not have existed at the above stage (e.g., these new wavelet coefficients were previously quantized to zeros). The quantization process is further described below. The output of this second stage, BS1, is the second portion of the output bitstream, e.g., the additional information that when combined with the first SNR layer produces the second SNR layer.

The quantized coefficients of the second stage $1410_2$ are also reconstructed and subtracted from the original coefficients, where the process is continued for the next stage and so on. As shown in FIG. 14, N+1 stages of the coder provides N+1 layers of SNR scalability. Each stage presents one layer of SNR. To obtain spatial (or both spatial and SNR) scalability, different spatial resolutions of the input image can be forwarded as input on path 1405. For example, a plurality of different spatial resolutions of the input image can be processed by the first stage $1410_1$ to generate a plurality of spatial scalability. In turn, if both spatial and SNR scalability is desired, each spatial resolutions of the input image can be processed by subsequent stages of the encoder portion 1400.

Quantization

In order to achieve a wide range of scalability levels efficiently as discussed above, a multilevel quantization method is employed in the present invention. Namely, $Q_n$ can be made to have some relationship with $Q_{N-1}$ which is defined by the encoder and specified in the bitstream to provide a very flexible approach to support the right tradeoff between levels and type of scalability, complexity and coding efficiency for any application. For example, after quantization in the first stage, each wavelet coefficient is either zero or nonzero. However, different quantization step sizes can be specified for each subsequent level of scalability, to produce refinement in the reconstruction of the wavelet coefficients in the above layer, e.g., all the quantizers can be uniform mid-rise quantizers with a dead zone 2 times the quantization step size. These quantization step sizes are then specified by the encoder in the bitstream, e.g., sending the quantization or bin indices.

In the preferred embodiment, the present MZTE quantization method consists of a set of quantization stepsizes Q, where each SNR layer has an associated Q value. The Q values are positive integers and represent the range of values a quantization level spans at that SNR layer. For the first layer each quantization level represents Q values ([level*Q, ..., (level+1)*Q–1]) if it is not the zero level; and 2Q–1 values ([–(Q–1)]) if it is the zero level. It is similar for the subsequent SNR layers except that the number of values may be one more or one less.

For the initial quantization, the wavelet coefficients are simply divided by the Q value for the first SNR layer. This provides the initial quantization level. For successive SNR layers, only correction indices that represent the refinement to quantized values are sent, where the refinement values are called "residuals" and are calculated by first calculating the number of refinement levels:

$$M\text{-}ROUND(prevQ/curQ) \qquad (3)$$

where:
prevQ is the previous SNR levels Q value,
curQ is the current SNR layers Q value, and
ROUND rounds of the nearest integer.

It should be noted that the division itself can be non-integer.

Each quantization inverse range of the previous SNR layer is partitioned such that it will effect the refinement levels as uniform as possible. This partitioning leaves a discrepancy of zero between the partition sizes, if prevQ is evenly divisible by curQ (e.g., prevQ=25 and curQ=5). If prevQ is not evenly divisible by curQ (e.g., prevQ=25 and curQ=10), then there is a maximum discrepancy of 1 between partitions. The larger partitions are always the ones closer to zero. The residual is simply the number of the partition where the original unquantized value actually lies in. Two scenerios are illustrated for this indexing:

Case I: If the previous SNR level quantized to zero (that is the value was in the dead-zone), then the residual has to be one of the 2m–1 values in$\{-m, \ldots, 0, \ldots, +m\}$.

Case II: If the previous SNR level quantized to a non-zero value, then (since the sign is already know at the inverse quantizer) the residual has to be one of the m values in $\{o, \ldots, m-1\}$.

The restriction of the possible values of the residuals are based on the relationship between successive quantization values and whether a given value was quantized to zero in the last SNR pass (both of these facts are known at the decoder). For similar reasons as discussed above, using two residual models for arithmetic coding (one for the first case and one for the second case) increases coding efficiency.

For the inverse quantization, the reconstruction levels (at the current SNR layer) are considered to be the midpoints of the quantization inverse range. Thus, the error is bounded to one-half the inverse range of the corresponding quantization level. One can reconstruct the quantization levels given the initial quantization value and the residuals. The above quantization method also allows bit-plane coding of the images using the constraint of halving the quantization stepsize for each additional SNR scalability.

Zero-tree Scanning and Adaptive Arithmetic Encoding

Figure 3:
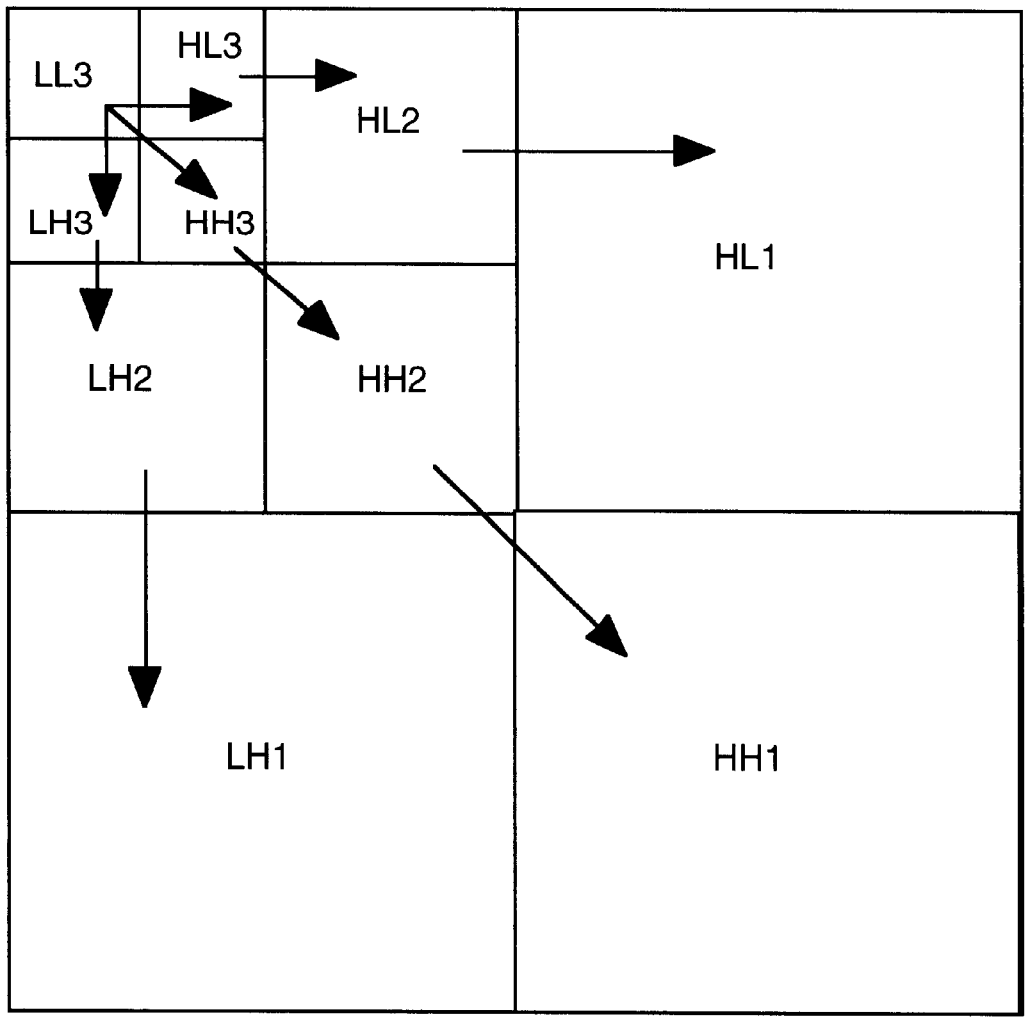
FIG. 3 is a schematic illustration of parent-child dependencies of subbands in an image decomposed to three scales within a wavelet tree.

Zero-tree scanning is based on the observation that strong correlation exists in the amplitudes of the wavelet coefficients across scales, and on the premise of partial ordering of the coefficients. FIG. 6 shows a wavelet tree where the parents and the children are indicated by boxes and connected by lines. Since the lowest frequency subband (shown at the upper left in FIG. 3 is coded separately using a backward prediction, the wavelet trees start from the adjacent higher bands.

In the above ZTS modules, zerotrees are deemed to exist at any tree node where the coefficient is zero and all the node's children are zerotrees. The wavelet trees are efficiently represented and coded by scanning each tree from the root in the low-low band through the children, and assigning one of four symbols to each node encountered: zerotree root, valued zerotree root, value, or isolated zero (IZ). Zerotrees do not need to be scanned further because it is known that all coefficients in such a tree have amplitude zero. A valued zerotree root is a node where the coefficient has nonzero amplitude, and all four children are zerotree roots, i.e., the scan of this tree can stop at this symbol. A value symbol identifies a coefficient with amplitude either zero or nonzero, but also with some nonzero descendant. An isolated zero (IZ) symbol identifies nodes which are zero but have nonzero on the tree below them.

Figure 15:
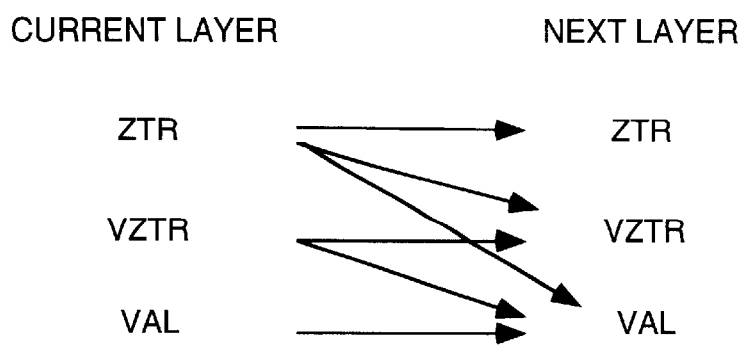
FIG. 15 illustrates a state diagram for predicting the significant map of the next layer from a previous layer.

The significant map generated by each layer in FIG. 14 is used to predict the significant map of the next layer. This process is illustrated in FIG. 15. Namely, if a node is found to be significant in one layer (and identified with VAL symbol), it will always be considered to remain significant in the following layers, so there is no need to retransmit its significant symbol and only its refinement value (to refine the magnitude) is put into the bitstream in each pass. In the similar manner, if a node is found to be VZTR, in the next pass it can remain VZTR or become a VAL node. If the fourth symbol, IZ, is also used, then a node with IZ symbol will be mapped to VAL or IZ only in the next iteration. One further improvement can achieved by comparing the subtree below a node with IZ symbol in two consecutive scalability layers. If the subtree has identical significant maps, then the encoder sends an ZTR symbol instead of IZ and skips the subtree significant maps in the second layer. Upon receiving ZTR symbol (instead of expected IZ or Val symbols), the decoder retrieve the subtree significant map from the previous layer and updates the subtree with refinements only.

The zero-tree symbols and the quantized values are coded using an adaptive arithmetic coder 114b. The arithmetic coder adaptively tracks the statistics of the zerotrees. Symbols and quantized coefficient values generated by the zerotree stage are all encoded using an adaptive arithmetic coder and a four-symbol alphabet. The lists of other nonzero quantized coefficients that correspond one-to-one with the valued zerotree root symbols are encoded using an alphabet that does not include zero. The remaining coefficients, which correspond one-to-one to the value symbols, are encoded using an alphabet that does include zero. For any node reached in a scan that is a leaf with no children, neither root symbol can apply. Therefore, some bits can be saved by not encoding any symbol for this node and encoding the coefficient using the alphabet that includes zero.

More specifically, in the arithmetic coder, three different tables (type, valz, valnz) must be coded at the same time. The statistics of each table is different and therefore the arithmetic coder must track at least three different probability models, one for each table. In one embodiment of the present invention, five different models are used for coding of these values: 1) type; 2) DC to code the nonzero quantized coefficients of the low-low band; 3) AC to code the nonzero quantized coefficients of the other three low resolution bands; 4) VaLNZ to code other nonzero quantized coefficients that correspond one-to-one with the valued zerotree root symbols and 5) VALZ to code the remaining coefficients which correspond one-to-one to the value symbols. For each wavelet coefficient in any wavelet block, first the coefficient is quantized, then its type and value are calculated, and last these values are arithmetic coded. The probability model of the arithmetic coder is switched appropriately for each table. For each model, the alphabet range is found, and this value, max-alphabet, is put into bitstream.

The coder output is one single bitstream for each luminance and color component. Therefore, three different bitstreams are generated for each motion compensated residual frame. The three bitstreams are concatenated and appropriate header is added to fit in the main output bitstream of the coder. In the cases in which all of the luminance or chrominance residual components are quantized to zero, a skip code is sent to minimize the coding cost of that residual component.

Alternatively, the present invention incorporates a mixed zeroth and first order probability model for the arithmetic coder. To illustrate, for the arithmetic coder to work optimally, it would typically need to use the joint probabilities of the symbols. The adaptive arithmetic coder tries to model the probabilities it needs based on the past history of the symbols it has encoded. A simple model that can be used is a zeroth order model based only on the number of occurrences (in the past) of the symbols to be encoded. Namely, a zeroth order model is simply a cumulative model. Thus for the encoding of an n symbol sequence (here signified by x1,x2, . . . , xn) each probability $Pr(x1, x2, \ldots, xn)$ is approximated by the frequency count which estimates $Pr(x1)Pr(x2) \ldots Pr(xn)$. The model must be initialized, via the frequency count, to some assumed distribution. Often a uniform distribution is assumed. Because of this initialization, the model needs to encode some symbols before the frequency count can reflect the "true" zeroth order distribution, $Pr(xi)$ (if it exists).

An improvement to the zeroth order model would be a first order model which keeps track of the number of occurrences of each symbol conditioned on the previous symbol which occurred. Namely, a first order model simply looks back at a small "window" of occurrences in the past. This model estimates the probability $Pr(x1)Pr(x2|x1) \ldots Pr(xn|x(n-1))$. However, this method takes many more symbols to reflect the "true" first order distribution than the zeroth order distribution. Thus, until the first order model is operating for a period of time, the arithmetic coder may not perform optimally to the "true" first order distribution.

An alternate embodiment of the present invention incorporates a compromise where both distributions are used simultaneously, a combination of the zeroth order with the first order model. Since the zeroth order model reflects the true distribution faster, the zeroth order model should have more influence for the first symbols encoded, while the first order model may take over after a sufficient number of symbols have been encoded.

In order to use a mixed model for the present invention, each model is tracked using four different tables. The first two tables will correspond to the zeroth order model's frequency and cumulative frequency counts. The frequency count means the number of times a symbol has occurred in the past. The third and fourth tables will correspond to the first order frequency and cumulative frequency counts. It should be noted that, for the first order tables, each occurrence of a symbol is allowed to add a fixed integer value greater than one to these tables. This extra count value for the first order table gives it a greater weighting than the zeroth order table.

Let nsym be the number of symbols we are encoding. One can assume that these symbols are one of: $\{0, 1, \ldots, nsym-1\}$. For the zeroth order, one need nsym elements for the frequency count table and nsym+1 elements for the cumulative frequency count table (the extra element for cumulative frequency count table is always zero and is used to simplify the programming). For the first order table, one need to keep counts for each of the nsym symbols which could possibly have been the last one to have occurred. Thus nsym*nsym elements are needed for the frequency count table and nsym*(nsym+1) elements for the cumulative frequency count table. The zeroth order table is initialized to reflect a uniform distribution (the frequency count for all symbols=1), while the first order table has all counts initially set to zero.

A state (or context) variable corresponding to the last symbol encoded is kept. It is initialized to the symbol 0. (i.e. the first symbol encoded increments the first order table values as if the 0 symbol was the last symbol encoded). This variable is updated to the new symbol with each symbol encoding.

The actual frequencies used to generate the model probabilities needed by the arithmetic coder are a simple sum of values from the zeroth and first order tables. For example if the last symbol coded was S and the new symbol is T and one assume that the first order tables are two dimensional with the first dimension corresponding to the last symbol coded (i.e. the first order table is made up of nsym one-dimensional tables similar to the zeroth order tables) then one can use the sum of frequencies from the S-th element in the zeroth order table and the S-th element in the T-th first order table. Let freq Zeroth be the zeroth order table and freqFirst be the first order table, one can write this symbolically as freqZeroth[S] +freqFirst[T][S].

In one embodiment of the present multiscale ZTE (MZTE) method, the above mixed order model is employed to improve the performance of the arithmetic coder as follows:

a) Separate probability model for residuals: if a value is quantized to a nonzero value at one of the previous scalability layers, it is considered as a residual and its refinement index is entropy coded with a different adaptive model. This adaptive model represents the statistical behavior of the residuals that are quite different than the values.

b) Improved mixed order model: To get a better estimate of the "real" probability, first and mixed order probability models are added to the coder. The first-order modeling is used by the mixed-order model to perform the entropy coding. In sum, the method attempts to estimate the probability that a symbol occurs given that the magnitude of the last symbol occurring falls within a certain pre-defined range.

It should be noted that a simple first-order model takes more symbols to represent a presupposed "true" probability distribution and more symbols to react to changes in that distribution than the zeroth-order model. This is because there are more tables to fill.

The mixed-order model part is weighted more than the zeroth-order model. This weighting is implemented through the frequency count increments. The zeroth-order model part uses unit increments while the first-order model part uses increments with values greater than one. Using experimental results, the first-order increments are fixed for different types of symbol sets which are encoded. The mixed-order model is a balance between the quick adaptation time of the zeroth-order model and the better probability modeling of the first-order model.

Bi-level (bitplane) Arithmetic Coding:

Alternatively, the present MZTE method may incorporate bi-level (bitplane) arithmetic coding. Since the arithmetic coder has a probability model with "n" bins where n is the maximum value exists in the set, then one alternative method of coding these values is to represent the values with binary numbers and encode each digit using the binary arithmetic coder (otherwise known as coding by bitplanes). Namely, the probability model has only 2 bins: one for '0' and one of '1' for encoding the wavelet quantized values. In this method, the adaptive model is initialized with uniform distribution. Starting from the most significant bit (MSB), all MSB of the values are encoded using one adaptive model. Then the model is reset to uniform distribution and the second MSB bits of all values are coded. The process continues until the last digit of all values is encoded. The number of digits is sent to decoder.

This bi-level coding scheme can be used in all coding modes in MZTE. The binary arithmetic coding has lower computational complexity than N-symbol arithmetic coding. The coding efficiency is also improved over coding the magnitude as a single symbol.

Residual Handling

An alternate embodiment of the present invention incorporates a residual handling method to improve the above multiscale zerotree entropy coding (MZTE) method. To reiterate, if a wavelet coefficient value at a given node has had a non-zero value after quantization in a previous scalability layer (spatial or SNR), then the nodes refinement values at subsequent layers are called residuals.

In the above MZTE, when the zerotree structure is created for a scalability layer, the residuals are treated in the same way as the non-residuals. Namely, their values specify their significance both in assigning the zerotree types of ancestor' nodes (nodes in the lower frequency bands with corresponding spatial location) and in assigning the zerotree types of their own node. Thus, in the case that the residual is zero and the node is not a leaf (i.e., it has descendants), the residual value (refinement index) does not have to be sent. This is due to the fact that the zerotree type would then be sufficient to provide the information that the residual value is zero to the decoder. If the node is zero then the nodes zerotree type will be either a ZR descendant, ZTR, or IZ. The ZTR descendant status of a node is ZTR and IZ types must be encoded and placed on the bitstream. A ZTR is sent when all descendants are zero and an IZ otherwise. If the residual is non-zero then it will be assigned a VAL or VZTR type (depending on the significance of it's descendants) and the value of the refinement index sent.

Alternatively, three alternate residual handling embodiments can be implemented to improve coding efficiency. First, when the zerotree structure is created for a scalability layer, all the residuals are treated as if they have zero value. Second, the residual values (refinement indices) are always sent (whether zero or not). Finally, the zerotree types of residuals are never sent.

These changes indicate that unless a residual is a ZTR descendant (which implies that all it's descendants are ZTR descendants also) its first non-residual descendants must always be coded. This is because the type of the residual is not sent and thus no information about the significance of its descendants is sent. Namely, if a node is of zerotree type VZTR or ZTR, then all of its descendant nodes are zero. If a node is of type VAL, or IZ, then some significant descendants exist. It also indicates that residual values of zero must now be sent. In terms of coding efficiency, the above two facts are traded off against the facts that now type information never is sent for residuals and also more zerotrees will be created due to the fact that residuals act as if they have zero value when creating the zerotrees.

Adaptation Rate

In one embodiment of the above arithmetic coder of the MZTE multiple probability models are employed, each of which is implemented as a histogram. Each histogram has a maximum frequency, which is set to a large fixed value ($2^{14-1}$) for all models used in single-quant and multi-quant modes. After encoding/decoding each symbol, the corresponding histogram entry is incremented. When the sum of all the counts in a histogram reaches the maximum frequency count, each entry is incremented ad integer divided by two. All the arithmetic models are initialized at the beginning of each SNR layer and for each color component.

It can be seen that the maximum frequency count controls the adaptation rate of the model. In other words, maximum frequency count controls how much the effect of previously coded symbols is on the current histogram. The larger the maximum frequency count is, the longer lasting the effect of these previously coded symbols. An alternate embodiment of the present invention incorporates two methods to control the adaptation rate.

First, as there are different number of symbols in the alphabet of each model, the maximum frequency is allowed to vary for different models in MZTE, especially by reducing the value of the maximum frequency for some models. Thus, each probability model can be tuned to adapt to its own probability distribution.

Second, an alternative method of achieving similar effect as changing the maximum frequency is to change the frequency of the model initialization. Instead of initializing all models at the beginning of each SNR layer and for each color component, initialization is performed for all the models for each subband in each color and SNR loop.

Zero-Tree States for MZTE Coding:

An alternate embodiment of the present MZTE method is the use of "Zero-Tree States" to reduce the complexity of both the encoder and the decoder. In operation, the above MZTE method employs the similar concept of using a set of symbols (e.g., zero-tree symbols) to represent the significance of the wavelet coefficients in a given tree. These zero-tree symbols are put into bitstream to represent the significance of the wavelet coefficients in a given tree.

However, due to the high dependencies between each symbol and the other zerotree symbols in current and previous scalability layer, finding the correct symbol at the encoder side and the correct interpretation of a symbol at the decoder side becomes a complex task. The present alternate embodiment introduces a new set of zerotree symbols, to be called "Zero-Tree States" which are not put into bitstream, but are used to determine the next possible state of the encoder/decoder at any given pixel, i.e., at a particular node in the wavelet tree.

Figure 16:
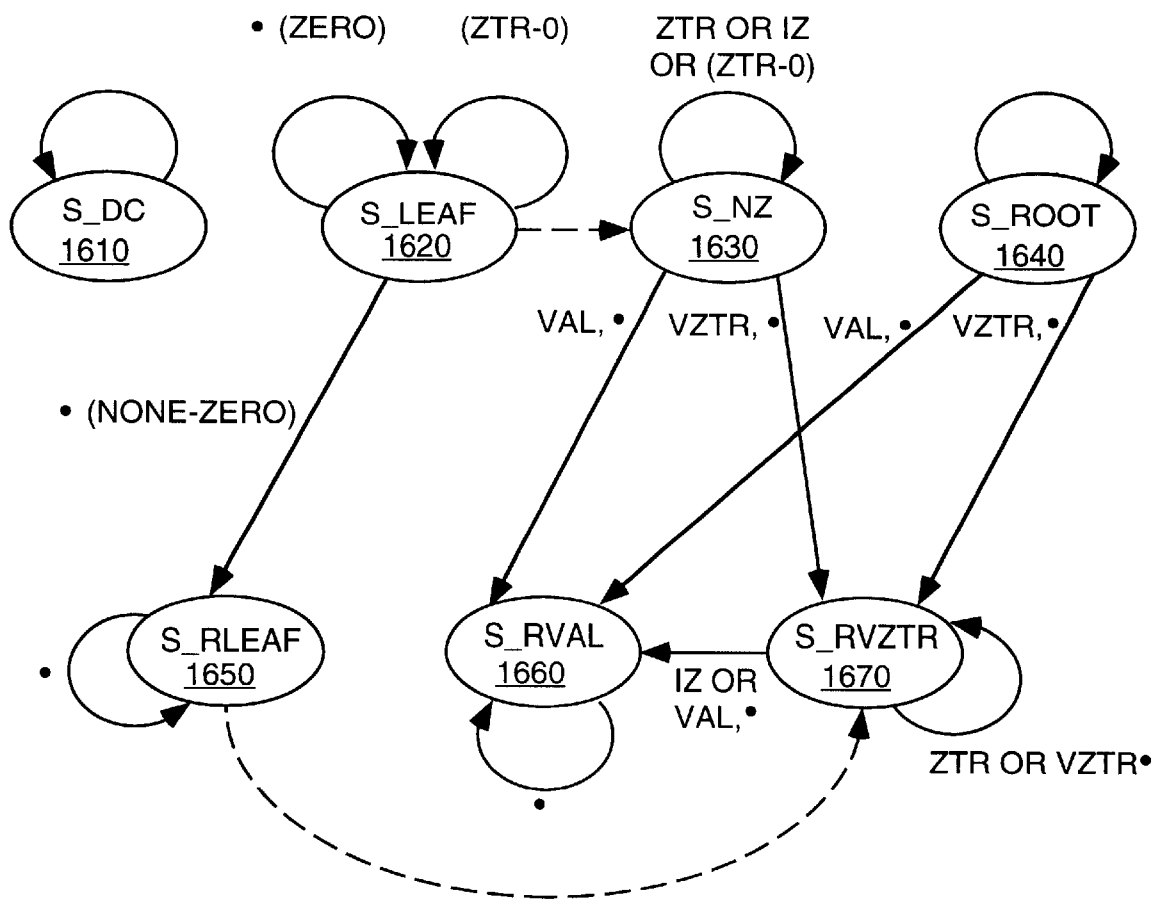
FIG. 16 illustrates a state diagram for tracking the state of each wavelet coefficient using Zero-Tree States.

The above MZTE may use a three symbol set (ZTR, VAL, VZTR) or a four symbol set (ZTR, VAL, VZTR, IZ) for encoding. It should be clarified that these zerotree symbols are still placed into the bitstream, but a new set of symbols (Zero-Tree States) is used for tracking the state of each coefficient. Each wavelet coefficients has one distinct zerotree state at each layer of scalability. The coefficients are encode/decode going from one state to another state using the original zerotree symbols. FIG. 16 illustrates a state diagram for tracking the state of each wavelet coefficient. A seven (S_DC, S_LEAF, S_NZ, S_ROOT, S_RLEAF, S_RVAL, S_RVZTR) set of symbols are used for the Zero-Tree states, where S_DC, S_LEAF, S_NZ, S_ROOT can be initial states. These are defined as:

S_DC (1610): state of the DC wavelet coefficients; once encoding starts, it remains in the same state.

S_ROOT (1640): zerotree state, the coefficient is zero and all of its descendants are zero; a zerotree root ZTR is issued and returns to state 1640; if the coefficient is zero and one of its child is not zero, an isolated zero is issued and returns to state 1640; if the coefficient is a value, then the value is quantized and the magnitude is sent; if the coefficient is a value, but all children are zero, then the value is quantized, and sent VZTR.

S_RVAL (1660): residual value state, the coefficient has been coded at least once as VAL in previous scalability layers;

S_RVZTR (1670): residual value zerotree state, the coefficient has been coded at least once as VZTR in previous scalability layers.

S_LEAF (1620): the state for wavelet coefficients which are located at the zerotree leaf and is coded for the first time in the current scalability layer;

S_NZ (1630): the state for a non-zero wavelet coefficients which is coded for the first time;

S_RLEAF (1650): the state of a wavelet coefficient located on a zerotree Leaf which have been coded at least once in the previous scalability layer; and S_RVAL (1660): the state for a non-zero wavelet coefficient which has been coded at least once in previous scalability layers.

FIG. 16 shows the state diagram for the zerotree states. As is shown in this figure, the zerotree symbols and their values are coded by transiting from one state to another. In the figures, the zerotree symbol and the possible value that are put into bitstream are shown for all transition. The "solid dots" indicate the values or magnitudes of the coefficients are sent; "( )" indicates do not sent and " - - - -" indicates spatial layer addition.

Using these state machines, both encoder and decoder can easily switch the arithmetic coding models by associating one separate model for each state. As for entropy coding values, each transition also indicates which model should e used for encoding/decoding of the value.

Figure 17:
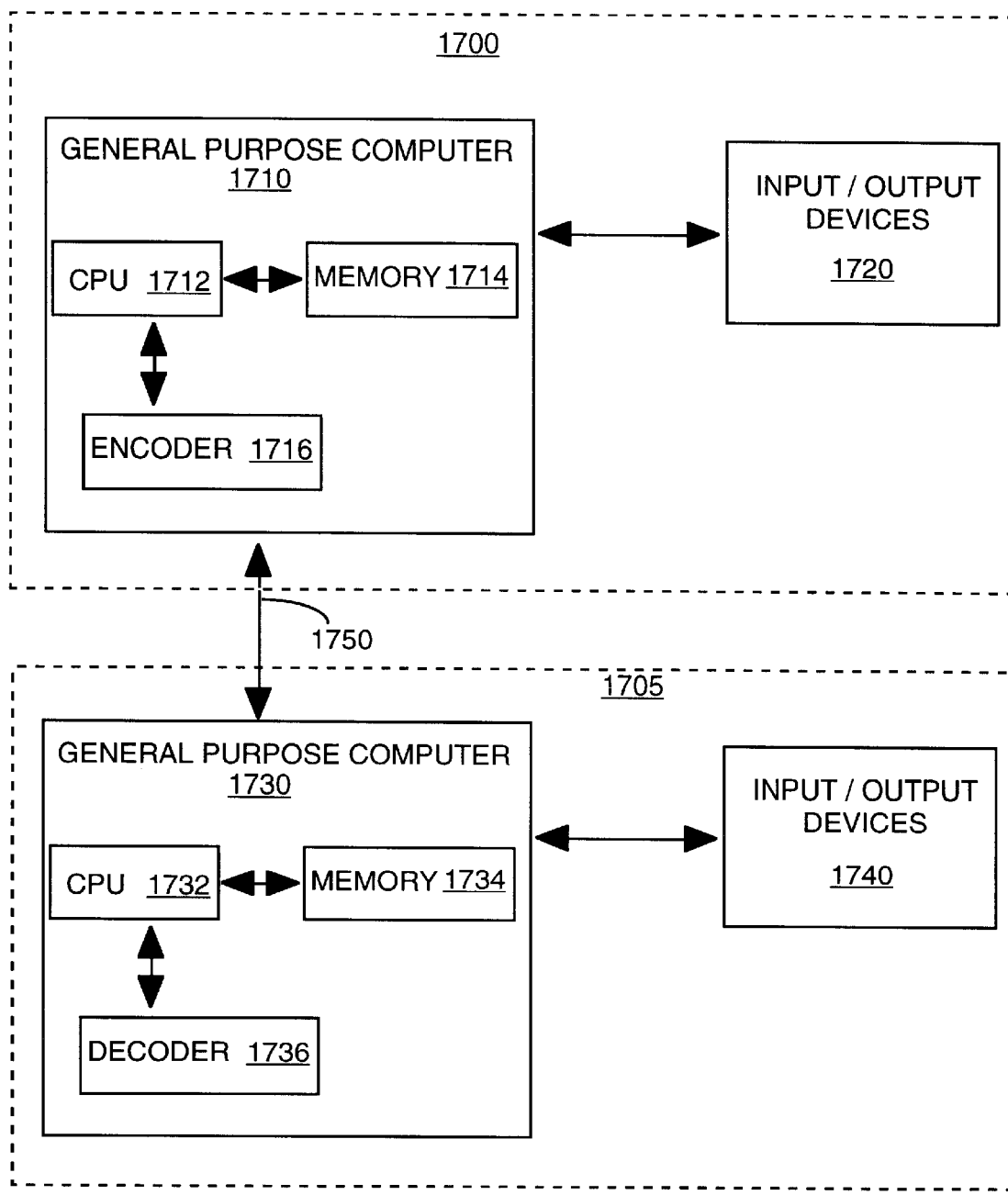
FIG. 17 illustrates an encoding system and a decoding system of the present invention.

FIG. 17 illustrates an encoding system 1700 and a decoding system 1705 of the present invention. The encoding system 1700 comprises a general purpose computer 17and various input/output devices 1720. The general purpose computer comprises a central processing unit (CPU) 1712, a memory 1714 and an encoder 1716 for receiving and encoding a sequence of images.

In the preferred embodiment, the encoder 1716 is simply the encoder 100 and/or encoder 1400 as discussed above. The encoder 1716 can be a physical device which is coupled to the CPU 1712 through a communication channel. Alternatively, the encoder 1716 can be represented by a software application (or a combination of software and hardware, e.g., application specific integrated circuit (ASIC))which is loaded from a storage device, e.g., a magnetic or optical disk, and resides in the memory 1714 of the computer. As such, the encoder 100 and encoder 1400 of the present invention can be stored on a computer readable medium, including the bitstreams generated by these encoders.

The computer 1710 can be coupled to a plurality of input and output devices 1720, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device.

The encoding system is coupled to the decoding system via a communication channel 1750. The present invention is not limited to any particular type of communication channel.

The decoding system 170comprises a general purpose computer 1730 and various input/output devices 1740. The general purpose computer comprises a central processing unit (CPU) 1732, a memory 1734 and an decoder 1736 for receiving and decoding a sequence of encoded images.

In the preferred embodiment, the decoder 1736 is simply any decoders that are complementary to the encoders 100 and 1400 as discussed above for decoding the bitstreams generated by the encoders 100 and 1400. The decoder 1736 can be a physical device which is coupled to the CPU 1732 through a communication channel. Alternatively, the decoder 1736 can be represented by a software application which is loaded from a storage device, e.g., a magnetic or optical disk, and resides in the memory 1734 of the computer. As such, any of complementary decoders of encoders 100 and 1400 of the present invention can be stored on a computer readable medium.

The computer 1730 can be coupled to a plurality of input and output devices 1740, such as a keyboard, a mouse, a video monitor, or any number of devices for storing or distributing images, including but not limited to, a tape drive, a floppy drive, a hard disk drive or a compact disk drive. The input devices serve to allow the computer for storing and distributing the sequence of decoded video images.

Although various embodiments which incorporate the teachings of the present invention have been shown and described in detail herein, those skilled in the art can readily devise many other varied embodiments that still incorporate these teachings.

What is claimed is:

1. A method for encoding an input image into a bitstream using a wavelet transform to produce a wavelet tree having a plurality of wavelet coefficients organized in a parent-child relationship into a plurality subbands, said method comprising the steps of:

(a) generating a wavelet tree having a plurality of original wavelet coefficients for the input image;

(b) quantizing said plurality of original wavelet coefficients with a first quantizer;

(c) applying zerotree scanning to at least one of said plurality of subbands in a depth-first manner to assign a symbol to at least one of said quantized wavelet coefficients of said wavelet tree;

(d) coding said plurality of quantized wavelet coefficients in accordance with said assigned symbol to generate a first scalability layer; and (e) reconstructing said quantized wavelet coefficients to generate a next scalability layer.

2. The method of claim 1, wherein said coding step (d) generates a first signal-to-noise (SNR) scalability layer.

3. The method of claim 1, wherein said coding step (d) generates a first spatial scalability layer.

4. The method of claim 1, wherein said coding step (d) generates a first signal-to-noise (SNR) and spatial scalability layer.

5. The method of claim 1, wherein said applying zerotree scanning step (c) applies zerotree scanning, to said plurality of subbands that are above a LL subband.

6. The method of claim 5, further comprising the step of:

(d') coding said quantized wavelet coefficients in said LL subband by applying a backward prediction.

7. The method of claim 1, wherein said reconstructing said quantized wavelet coefficients step (e) comprises the steps of:

(e1) applying inverse quantization to said quantized wavelet coefficients;

(e2) subtracting said reconstructed wavelet coefficients from said original wavelet coefficients to generate residual wavelet coefficients; and (e3) generating said next scalability layer from said residual wavelet coefficients.

8. The method of claim 7, wherein said generating said next scalability layer step (e3) comprises the steps of:

(e31) quantizing said plurality of residual wavelet coefficients with a second quantizer;

(e32) applying zerotree scanning to assign a symbol to at least one of said quantized residual wavelet coefficients; and (e33) coding, said plurality of quantized residual wavelet coefficients in accordance with said assigned symbol to generate said next scalability layer.

9. The method of claim 8, wherein said coding step (e33) further comprises the step of coding said quantized residual wavelet coefficients by using refinement values.

10. The method of claim 8, wherein said applying zerotree scanning step (e32) comprises the step of using zero-tree states to assign a symbol to at least one of said quantized residual wavelet coefficients.

11. The method of claim 7, wherein said coding step (d) further comprises the step of coding said quantized wavelet coefficients by using residual handling.

12. The method of claim 11, wherein said residual handling comprises the step of:

coding a refinement index only for a nonzero residual value.

13. The method of claim 11, wherein said residual handling comprises the step of:

treating all residuals as having a zero value.

14. The method of claim 11, wherein said residual handling comprises the step of:

coding all refinement indices regardless of values of a plurality of residuals.

15. The method of claim 11, wherein said residual handling comprises the step of:

coding a symbol of a node of a residual value only if said node has a symbol type other than a zerotree symbol type.

16. The method of claim 8, wherein said coding step (d) comprises the step of using an adaptive arithmetic coder to code said plurality of quantized wavelet coefficients.

17. The method of claim 16, wherein said coding step (d) further comprises the step of maintaining separate tables of different models for said adaptive arithmetic coder.

18. The method of claim 17, wherein said step of maintaining separate tables comprises the steps of:

maintaining at least one table using a zeroth order model and maintaining at least one table using a first order model.

19. The method of claim 17, wherein said step of maintaining separate tables comprises the steps of:

maintaining a first table for tracking a frequency of a zeroth order model;

maintaining a second table for tracking cumulative frequency counts of said zeroth order model;

maintaining a third table for tracking a frequency of a first order model; and maintaining a fourth table for tracking cumulative frequency counts of said first order model.

20. The method of claim 16, further comprising the step of:

selectively adjusting a maximum frequency of a probability model of said adaptive arithmetic coder.

21. The method of claim 16, further comprising the step of:

initializing a probability model of said adaptive arithmetic coder for each of said scalability layer.

22. The method of claim 1, wherein said coding step (d) comprises the step of using an adaptive bitplane arithmetic coder to code said plurality of quantized wavelet coefficients.

23. An apparatus for encoding an input image into a bitstream using a wavelet transform to produce a wavelet tree having a plurality of wavelet coefficients organized in a parent-child relationship into a plurality subbands, said method comprising the steps of:

means for generating a wavelet tree having a plurality of original wavelet coefficients for the input image;

means for quantizing said plurality of original wavelet coefficients with a first quantizer;

means for applying zerotree scanning to at least one of said plurality of subbands in a depth-first manner to assign a symbol to at least one of said quantized wavelet coefficients of said wavelet tree;

means for coding said plurality of quantized wavelet coefficients in accordance with said assigned symbol to generate a first scalability layer; and means for reconstructing said quantized wavelet coefficients to generate a next scalability layer.

24. A computer-readable medium having stored thereon a plurality of instructions, the plurality of instructions including instructions which, when executed by a processor, cause the processor to perform the steps of:

(a) generating a wavelet tree having a plurality of original wavelet coefficients organized in a parent-child relationship into a plurality subbands for an input image;

(b) quantizing said plurality of original wavelet coefficients with a first quantizer;

(c) applying zerotree scanning to at least one of said plurality of subbands in a depth-first manner to assign a symbol to at least one of said quantized wavelet coefficients of said wavelet tree;

(d) coding said plurality of quantized wavelet coefficients in accordance with said assigned symbol to generate a first scalability layer; and (e) reconstructing said quantized wavelet coefficients to generate a next scalability layer.

* * * * *